No. 755,786. PATENTED MAR. 29, 1904.
W. L. MARTIN.
METALLIC DISH.
APPLICATION FILED DEC. 10, 1903.
NO MODEL.

Witnesses:
Jas. E. Hutchinson.
Edward H. Young.

Inventor:
Wm. L. Martin,
By T. A. C. M. Milans
Attorneys.

THE NORRIS PETERS CO., PHOTO-LITHO., WASHINGTON, D. C.

No. 755,786. Patented March 29, 1904.

UNITED STATES PATENT OFFICE.

WILLIAM L. MARTIN, OF MIDDLETOWN, CONNECTICUT, ASSIGNOR TO THE SILVER CITY PLATE COMPANY OF MERIDEN, CONNECTICUT.

METALLIC DISH.

SPECIFICATION forming part of Letters Patent No. 755,786, dated March 29, 1904.

Application filed December 10, 1903. Serial No. 184,656. (No model.)

*To all whom it may concern:*

Be it known that I, WILLIAM L. MARTIN, a citizen of the United States, residing at Middletown, in the county of New Haven and State of Connecticut, have invented certain new and useful Improvements in Metallic Dishes, of which the following is a specification, reference being had therein to the accompanying drawings.

This invention relates to improvements in metallic dishes, and has for its primary object the provision of a dish of this character having integral supporting-feet constituted by depressed portions of the bottom thereof, said depressed portions being so disposed as to also form crumb-pockets in the lower portion of the dish.

The invention also comprehends a dish having crumb-pockets whether or not the structural formation of the same is coincident with that of the supporting-feet of the dish, as above mentioned.

The novel details in the construction and arrangement of the several parts of a dish made in accordance with the present invention will be apparent from the description hereinafter when read in connection with the accompanying drawings, forming a part hereof and wherein a convenient embodiment of the invention is illustrated.

Figure 1:
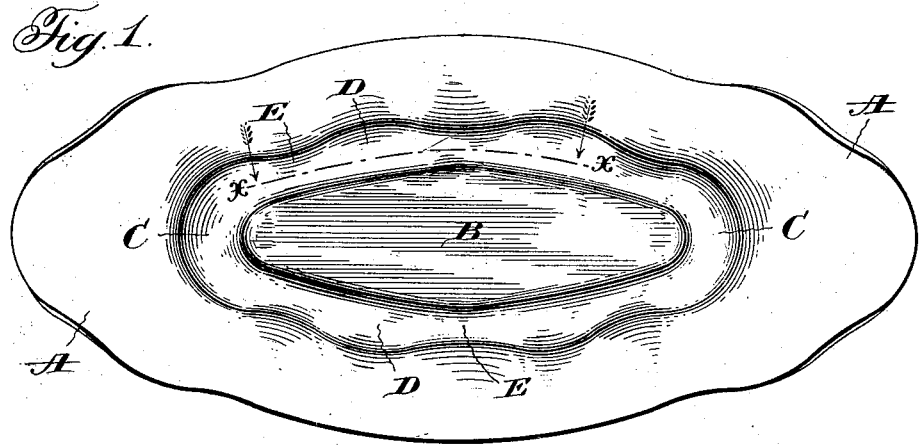
Figure 2:
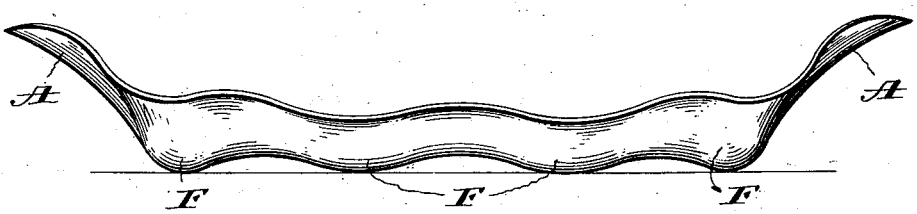
Figure 3:
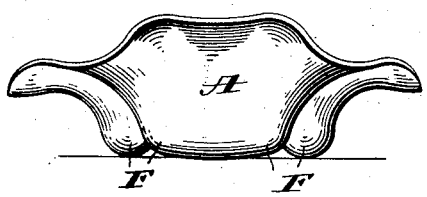
Figure 4:
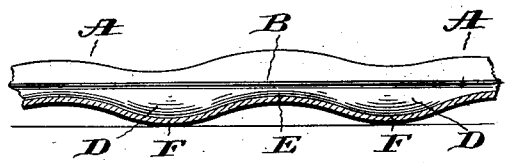

In the drawings, Figure 1 is a plan view of the dish. Fig. 2 is a side elevation thereof; Fig. 3, an end view, and Fig. 4 a sectional view through a portion of Fig. 1 on the line $x\ x$.

Referring more specifically to the drawings, A designates a metallic dish, which may be of any desired configuration, the same having a substantially flat bottom B. Surrounding the bottom B is a continuous groove C, formed by integral depressed portions of said bottom, said groove in turn having alternately-arranged relatively deep and shallow portions, (represented, respectively, at D and E,) the deeper portions D constituting crumb-pockets within the dish and also serving as supporting-feet therefor, as shown at F.

The provision of the crumb-pockets is a most desirable feature of the invention, particularly when the same is embodied in a bread or cake tray and candy or bonbon dish, inasmuch as the pockets are of course rather small, which prevents the articles themselves from falling thereinto, but are so disposed as to receive any crumbs or loose particles falling therefrom.

The depression of the groove C into relatively deep and shallow portions is possessive of strong structural characteristics. It is appreciated that there are objections attending the soldering of independent feet or legs to metallic dishes and that the integral formation thereof with the bottom of the dish will overcome such objections. However, when the legs are depressed from the metal of the dish to a sufficiently perceptible extent to constitute the feet there is danger of the metal breaking or cracking incident to the necessary abrupt bending thereof. This undesirable feature is obviated by the gradual expanding of the metal from the plane of the base to the relatively shallow depressed portions of the groove C and thence into the relatively deep portions thereof, which latter, as before stated, constitute the feet F, and the walls of these feet, as shown, being rounded longitudinally and transversely and merging into the material of the other portions of the dish, materially strengthening the same, preserve the bottom of the dish from becoming indented or otherwise impaired structurally or artistically as a result of careless or rough handling.

Having thus described the invention, what is claimed as new, and desired to be secured by Letters Patent, is—

A metallic dish of the character described provided with a groove in the bottom thereof formed by integral depressed portions of said bottom, and said groove having separated relatively deep and shallow portions, said deep portions being rounded longitudinally and transversely and constituting supporting-feet for the dish.

In testimony whereof I affix my signature in presence of two witnesses.

WILLIAM L. MARTIN.

Witnesses:
MAX CLESINGER,
ALFRED B. AUBREY.